/

US008229082B2

(12) United States Patent  
Hagale et al.

(10) Patent No.: US 8,229,082 B2
(45) Date of Patent: Jul. 24, 2012

(54) AWARENESS AND NEGOTIATION OF PREFERENCES FOR IMPROVED MESSAGING

(75) Inventors: Anthony Richard Hagale, Austin, TX (US); Ryan Rozich, Austin, TX (US); Paul Stuart Williamson, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1446 days.

(21) Appl. No.: 10/870,530

(22) Filed: Jun. 17, 2004

(65) Prior Publication Data

US 2005/0281397 A1 Dec. 22, 2005

(51) Int. Cl.
*H04M 1/64* (2006.01)
*H04W 4/00* (2009.01)
*G06F 15/16* (2006.01)

(52) U.S. Cl. .................. 379/88.11; 379/88.22; 455/466; 709/228

(58) Field of Classification Search ............... 379/88.13, 379/88.22; 455/466; 709/228
See application file for complete search history.

(56) References Cited

U.S. PATENT DOCUMENTS

| | | | | |
|---|---|---|---|---|
| 5,982,853 | A * | 11/1999 | Liebermann | 379/52 |
| 6,311,215 | B1 | 10/2001 | Bakshi et al. | |
| 6,487,586 | B2 | 11/2002 | Ogilvie et al. | |
| 6,771,749 | B1 * | 8/2004 | Bansal et al. | 379/88.17 |
| 7,188,177 | B2 * | 3/2007 | Taylor | 709/227 |
| 7,305,681 | B2 * | 12/2007 | Khartabil | 719/328 |
| 7,400,712 | B2 * | 7/2008 | August | 379/88.01 |
| 7,463,897 | B2 * | 12/2008 | Kock | 455/466 |
| 7,522,712 | B2 * | 4/2009 | Inon | 379/88.26 |
| 7,634,556 | B2 * | 12/2009 | Huynh et al. | 709/223 |
| 7,664,882 | B2 * | 2/2010 | Mohammed et al. | 709/250 |
| 7,685,315 | B2 * | 3/2010 | Pessi et al. | 709/246 |
| 7,707,317 | B2 * | 4/2010 | Huynh et al. | 709/246 |
| 7,729,356 | B2 * | 6/2010 | Prouvost | 370/395.1 |
| 7,808,928 | B2 * | 10/2010 | Kim et al. | 370/255 |

(Continued)

FOREIGN PATENT DOCUMENTS

CA 2 389 472 12/2003

OTHER PUBLICATIONS

Patrice Godefroid et al., "Ensuring Privacy in Presence Awareness Systems: An Automated Verification Approach," 2002, pp. 59.

(Continued)

*Primary Examiner* — Joseph T Phan
(74) *Attorney, Agent, or Firm* — Stephen J. Walder, Jr.; Libby Z. Toub

(57) ABSTRACT

Methods, systems, and media are disclosed for a computer-implemented method for improved messaging between devices, which are local or remote to each other. One example embodiment includes a first device, having a first set of messaging preferences, receiving a second set of messaging preferences from a second device, such as a computer having instant messaging capabilities, in communication with the first device. Further, the example embodiment includes comparing the sets of messaging preferences to yield results showing if any conflicting messaging preferences exist between the devices. If conflicting messaging preferences exist, then the devices may negotiate in order to remove such conflicting messaging preferences. Further still, the example embodiment includes determining whether to commence the messaging based on the existence of any conflicting messaging preferences and by enforcing the possibly re-configured messaging preferences during a messaging session. If no conflicting preferences exist, then the messaging session commences.

17 Claims, 5 Drawing Sheets

U.S. PATENT DOCUMENTS

2002/0065894 A1    5/2002   Dalal et al.
2003/0105822 A1    6/2003   Gusler et al.
2003/0105825 A1    6/2003   Kring et al.
2003/0236892 A1*  12/2003   Coulombe .................... 709/228
2004/0204071 A1*  10/2004   Bahl et al. .................... 455/557
2005/0154594 A1*   7/2005   Beck ............................. 704/276
2008/0177851 A1    7/2008   Hagale et al.

OTHER PUBLICATIONS

Mark Handel et al., "What is Chat Doing in the Workplace," 2002, pp. 1.

Liscano et al., (INSPEC.: AN-6409053), "Configuring a Personal Communications Agent," 1999, pg. 1.

Research Disclosure: RD-4311173-A, "Secure and User Friendly Voice Cybervault for Computer Logins and Passwords to Multiple Local & Remote Serivces Using Text Independent Speaker Recognition & Continuous Speech Recognition," Mar. 3, 2000, pg. 1.

USPTO U.S. Appl. No. 12/055,581, 1 page.

"Secure and User Friendly Voice Cybervault for Computer Logins and Passwords to Multiple Local & Remote Services Using Text Independent Speaker Recognition & Continuous Speech Recognition", Research Disclosure: RD-431176-A, Mar. 10, 2000, p. 1.

* cited by examiner

AWARENESS AND NEGOTIATION OF PREFERENCES FOR IMPROVED MESSAGING

FIELD OF INVENTION

The invention generally relates to awareness and enforcement of messaging preferences associated with devices used in messaging. More particularly, the invention relates to methods, systems, and media for messaging between a first device, having a set of messaging preferences, and a second device also having a set of messaging preferences, wherein both devices are aware of the other device's associated messaging preferences, and the devices have the ability to negotiate over conflicting messaging preferences before engaging in messaging.

BACKGROUND

Messaging is a convenient and popular means for people to engage in local or remote communication. Through the use of devices, such as computers, personal digital assistants ("PDAs"), and cellular phones enabled by associated software and hardware providing user-friendly interfaces, people routinely engage in messaging through what are typically known as instant messaging ("IM") or text-messaging services.

IM is a type of messaging service that enables a person to create a kind of private chat room with another individual in order to communicate in real time over the Internet, and is analogous to a telephone conversation except that communication is text-based, not voice-based. Typically, an instant messaging system alerts a person whenever somebody on the person's private list, e.g., a "buddy list," is online. The person can then initiate a chat session with that particular individual. Many commercial providers exist for individuals to engage in IM, and popular IM service messaging systems include, for example, Lotus® Sametime®, American Online® ("AOL®'s") AIM[SM], MSN®, and Yahoo!®. Normally, these IM service messaging systems are installed to the devices used by individuals that engage in instant messaging.

Text messaging, like instant messaging, involves sending text messages to a device such as a cellular phone, PDA or pager. However, text messaging is used for messages that are no longer than a few hundred characters. The term is usually applied to messaging that occurs between two or more mobile devices. Like IM service messaging systems, the devices permitting text messaging have software installed to the devices used by the individuals engaging in text messaging.

Whether using an IM or text-messaging service, oftentimes, the hardware and software used to enable these systems include a myriad of useful preferences that govern an individual's messaging session with another. Examples of such preferences include automatically or not logging the textual communication occurring during the messaging session, setting styles and colors of font, enabling emoticon capabilities, enabling sound capabilities for certain messages, enabling or not enabling picture capabilities, setting filtering capabilities, such as those desired by parents, enabling or prohibiting webcam viewing capabilities, and so forth. Typically, a user of a messaging service system sets messaging preferences based solely on the user's preferences. That is, the preferences are strictly a matter of personal taste.

Despite advances in messaging, problems remain. For one, although a user of a messaging service system often pre-configures preferences for use while engaging in messaging, a remote user of the system is unaware of the user's preferences in effect while a messaging session occurs between them. Unawareness of another user's preferences may lead to disconcerting results. For instance, suppose a user desires that none of the user's messaging sessions are ever logged. Suppose further that the user begins a messaging session with another user of an IM service system, and the user textually communicates the preference that the user's messaging session not be logged. Even if the other user communicates that no logging will occur, the other user may surreptitiously decide to log the messaging session anyhow in accordance with that user's preferences. By this example, further problems are borne out. That is, there is no effective means to ensure enforcement of each user's preferences, and there is no effective means to discuss modifications to each other's preferences before each user decides to commence with the messaging session.

A need, therefore, exists, for methods, systems, and media for users of messaging systems to engage in messaging sessions with awareness of another user's preferences, to enable means for modifying one or more of at least one user's preferences, and to enforce a user's preferences, whether modified or not, prior to commencing a messaging session.

SUMMARY OF THE INVENTION

Embodiments of the invention generally provide methods, systems, and media for messaging among devices such as computers, cellular telephones, and PDAs having capabilities for instant messaging and/or text messaging. In one embodiment, the computer-implemented method for improved messaging between a first device and a second device generally includes receiving, by the first device having a first set of messaging preferences, a second set of messaging preferences from the second device in communication with the first device. Further, the method includes comparing, by the first device, the first set of messaging preferences to the second set of messaging preferences. Further still, the method includes determining, by the first device, whether to commence the improved messaging if one or more conflicts are revealed by the comparing. In further embodiments, the method includes receiving, by the second device, the first set of messaging preferences, as well as negotiating modifications to the sets of preferences before determining whether to engage in a messaging session.

In another embodiment, the computer-implemented system for improved messaging between a first device and a second device system generally includes a first receiver on the first device, having a first set of messaging preferences, for receiving the second set of messaging preferences from the second device in communication with the first device. Further, the system includes a first comparison module on the first device for comparing the first set of messaging preferences to the second set of messaging preferences. Further still, the system includes a first determination module on the first device for commencing the improved messaging if one or more conflicts are revealed by the first comparison module. In further example embodiments, the system another receiver on the second device for receiving the first set of messaging preferences from the first device, and further includes another negotiation module for each device to use to discuss modifications to the one or more conflicting preferences of one or both device's preferences before the determination modules permit commencement of the improved messaging session.

In yet another embodiment, the invention provides a machine-accessible medium containing instructions, which when executed by a machine, cause the machine to perform operations for improved messaging between a first device and a second device. The instructions generally include operations for receiving, by the first device having a first set of messaging preferences, a second set of messaging preferences from the second device in communication with the first device. Further, the instructions include operations for comparing, by the first device, the first set of messaging preferences to the second set of messaging preferences. Further still, the instructions include operations for determining, by the first device, whether to commence the improved messaging if one or more conflicts are revealed by execution of the instructions for comparing. In further embodiments, the instructions include operations for receiving, by the second device, the first set of messaging preferences, and, further, operations for negotiating modifications to one or both of the sets of messaging preferences before executing operations for determining whether to engage in a messaging session.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF EXAMPLE EMBODIMENTS

Figure 1:
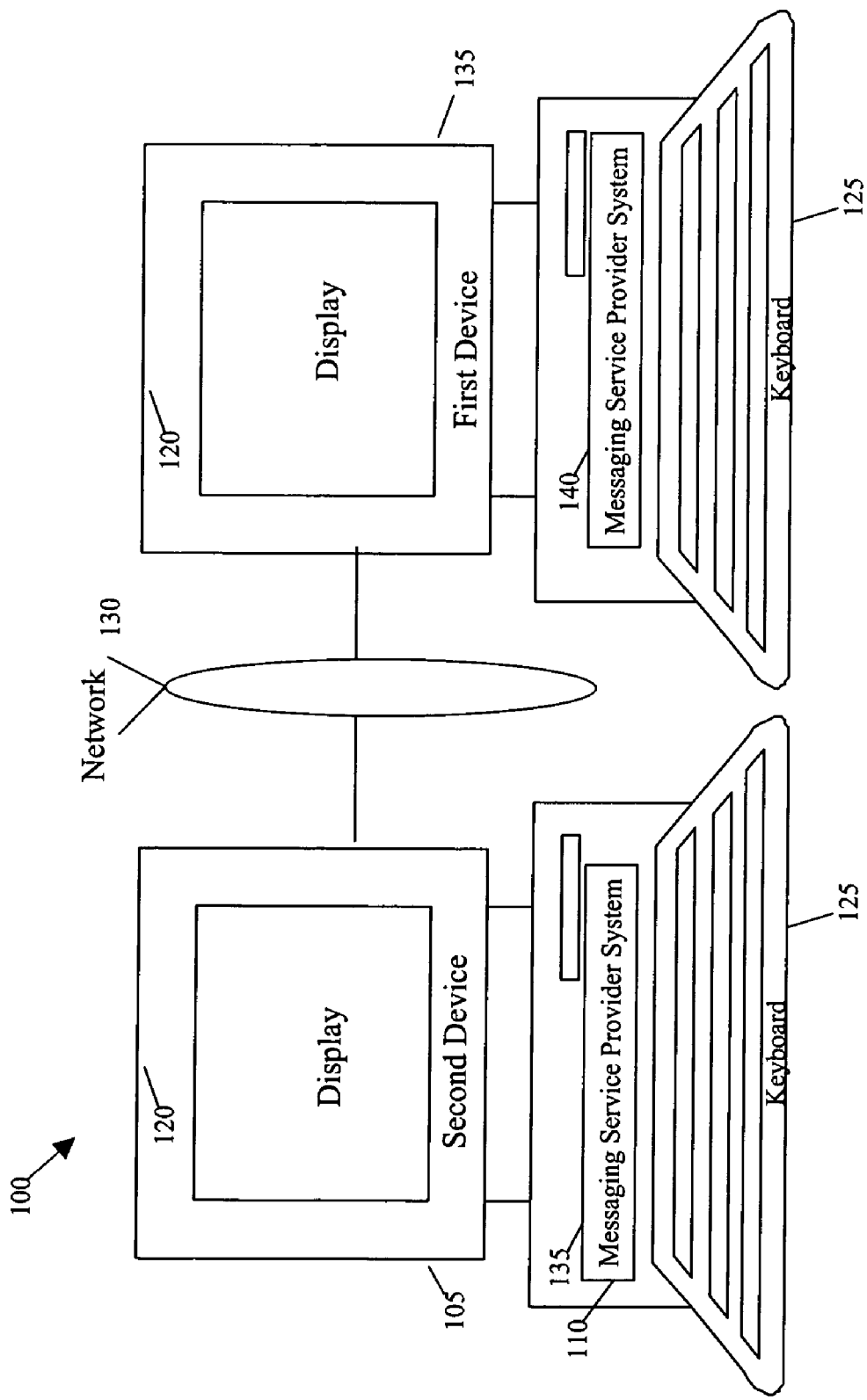
FIG. 1 depicts a system for messaging between a first device and a second device in accordance with the disclosed invention.

The following is a detailed description of example embodiments of the invention depicted in the accompanying drawings. The embodiments are examples and are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The detailed descriptions below are designed to make such embodiments obvious to a person of ordinary skill in the art.

Generally speaking, systems, methods, and media for improved messaging are contemplated. More specifically, the improved messaging contemplated is between a first device having a first set of preferences and a second device having a second set of configurable messaging preferences, wherein the user of at least one device is aware of each device's preferences, and may negotiate for modifications in the sets of preferences before commencing in a messaging session that is governed by the sets of possibly modified messaging preferences. Embodiments include a first device, such as a computer, cellular telephone, pager, or personal digital assistant ("PDA"), equipped with software and/or hardware for messaging capability offered in commercially available messaging service systems, e.g., Lotus® Sametime®, American Online®'s ("AOL®'s") AIM$^{SM}$, MSN®, and Yahoo!®. A device having such a messaging service system may connect over wired or wireless communications network to a second device, whether local or remote, such as a computer, cellular phone, pager, or PDA also having an installed messaging service system. The second device also has a set of configurable messaging preferences, which may be the same or different from the first device's.

Before the first device and the second device begin an improved messaging session, however, a first receiver on the first device receives the messaging preferences associated with the second device. Similarly, the second receiver on the second device may also receive the messaging preferences associated with the first device. After each or one of the devices receive the other's messaging preferences, a comparison of each device's messaging preferences ensues that yields results, which may include one or more conflicting preferences, i.e., conflicts. The results indicate whether there are conflicting preferences existing between the devices in communication. For example, if one device's pre-configured preferences, i.e., local settings on a device for its messaging sessions, is set to no logging, and the other device's pre-configured preferences is set to automatic logging during messaging sessions, then the results would yield a conflict. However, if the results indicate there are no conflicts, then, based on these results, the devices could commence a messaging session with the existing preferences enforced. In this manner, at least the user of the first device engages in a messaging session with awareness of the devices' preferences.

If the second device also receives the set of preferences from the first device, and after comparing performed by each device results in yielding one or more conflicts, then the devices may negotiate to modify these conflicts. Such negotiating is, in effect, attempts by the users of the devices to engage in communication for determining the intended messaging session's enforced preferences, i.e., the terms and conditions that will ultimately govern and remain in force during their messaging session to occur upon successful negotiation. If the negotiation is unsuccessful, one of the users will determine not to commence the messaging session based on the results not being successfully altered by changing preferences or waiving preferences. If, however, the negotiation is successful, then the users will determine to commence the messaging session. After terminating the messaging session involving a successful negotiation that modified one or both of the devices messaging preferences, then each device's messaging preferences return to their respective default messaging preferences.

Turning now to the drawings, FIG. 1 depicts an embodiment of a system 100 for messaging. The system 100 includes a second device 105, such as the depicted computer system, but the second device 105 could also be a cellular phone, PDA, or pager capable of engaging in messaging, i.e., instant or text. The capability for messaging is achieved by the second device 105 having software and/or hardware having a messaging service provider system 110 installed on the second device 105. Examples of commercially available messaging service provider systems 110 include Lotus® Sametime®, American Online®'s ("AOL®'s") AIM$^{SM}$, MSN®, and Yahoo!®.

In order to engage in messaging, the second device 105 has attendant peripherals, such as a keyboard 125 and mouse, for a user to enter text that is shown on a display 120, such as a monitor, connected to the second device 105. In addition, to engage in messaging, the system 100 depicts a communication means being a wireless network 130 between the second device 105 and a first device 135, which may be local or remote. However, other communication means are possible without departing from the scope of the invention. For example, the communication means may occur through Bluetooth™, IRDA, and a wired computer network provided the second device 105 and first device 135 are properly enabled with the necessary equipment and logic known to one of ordinary skill in the art.

FIG. 1 also depicts a first device 135 that is very similar in concept to the second device 105. That is, the system 100 includes a first device 135 intending to engage in messaging with the second device 105 of the system 100 over a network 130. Although FIG. 1 depicts the first device 135 as a computer system, the first device 135 could also be a cellular phone, PDA, or pager capable of engaging in messaging. Further, like the second device 105, the first device 135 includes a messaging service provider system 140 installed on the first device 135, and attendant peripherals, such as a keyboard 125 and a mouse, for a user of the first device 135 to enter text that is shown on a display 120 connected to the first device 135.

Figure 2:
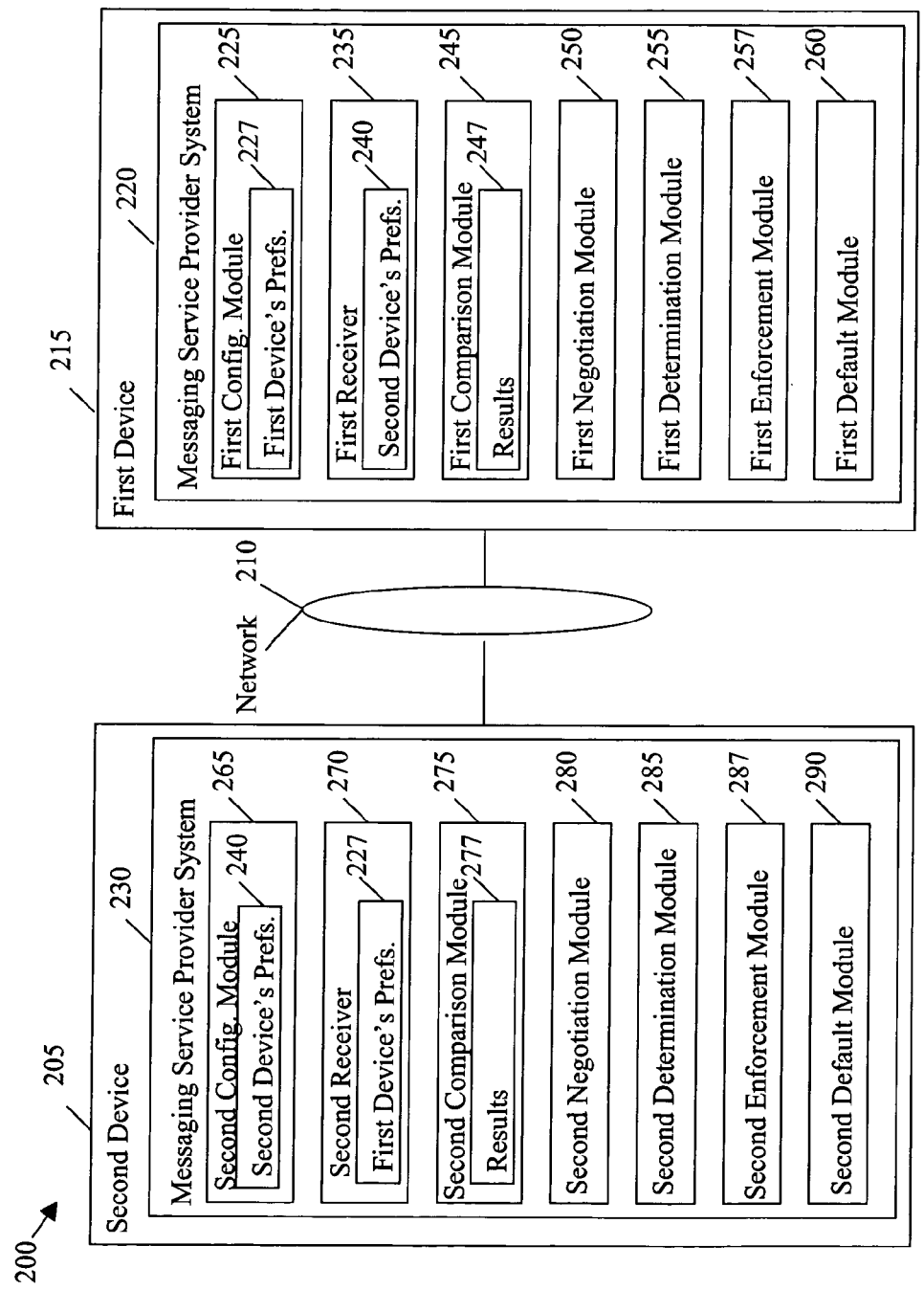
FIG. 2 depicts an example embodiment of a system for messaging between a first device and a second device in accordance with the disclosed invention.

Turning now to FIG. 2, system 200 depicts an expansive view of the awareness and negotiation aspects of the invention. Like FIG. 1, FIG. 2 depicts a second device 205 having a messaging service provider system 220 in communication over a network 210 with a first device 215 also having a messaging service provider system 230. However, FIG. 2 depicts additional features not shown in FIG. 1. Specifically, FIG. 2 depicts a system 200 having components integrated into the messaging service provider systems 220, 230. Although the system 200 depicts integrated components, and the following disclosure continues based on the system's 200 depiction, it is understood that the components may, for example, reside separately on the respective devices 205, 215, and work in tandem with the messaging service provider systems 220, 230 through enabling software and/or hardware known to one of ordinary skill in the art.

With reference to the first device 215, the system 200 shows a component entitled a configurator module 225. The configurator module 225, enabled through software and/or hardware, permits a user to configure, that is, set, preferences that govern the user's messaging sessions. Upon initial use, the preferences may come pre-configured by a vendor of the messaging service provider systems 220 installed on the first device 215. The user may alter, that is, re-configure, these pre-configured preferences to default preferences of the user's choosing through interactive communications, eg., dialogue boxes, pull down menus, etc., enabled by software and/or hardware associated with the configurator module 225. Examples of the preferences that the user may configure include whether to automatically or not logging the textual communication occurring during the messaging session, setting styles and colors of font, enabling emoticon capabilities, enabling sound capabilities for certain messages, enabling or not enabling picture capabilities, setting filtering capabilities, such as those desired by parents, enabling or prohibiting webcam viewing capabilities, and so forth.

In addition, the configurator module 225 may provide preferences for individualizing others' preferences for users of the first device 215. That is, multiple users may use the first device 215 for messaging, and a user, such as an administrator or parent, may set preferences, mutable by passwords for example, to be enforced by each user that messages from the first device 215. An example would be a parent setting different messaging preferences for their seventeen year old child using the parent's first device 215 for messaging as opposed to the same parent's eight-year old child using the parent's first device 215 for messaging. In a similar vein, a user may set different messaging preferences permissible to govern messaging sessions based on the individual of a second device 205 with whom the user of the first device 215 messages. Such individuals may appear on a configurable "buddy list" associated with the first device 215. The above-listed preferences are not an exhaustive list of configurable preferences achievable through use of the configurator module 225; instead, they are merely examples of but a few possible configurable preferences.

A further aspect of the configuration module 225, enabled through coded logic and/or logic reduced to hardware, permits configuring an acquiescence parameter for the messaging preferences associated with the first device 215. Further, configuring the acquiescence parameter for each of the messaging preferences is for automatic acquiescence. Automatic acquiescence configuring is realized, for example, when the first device 215 and the second device 205 attempt to engage in an improved messaging session, and a comparison of each devices' 205,215 set of preferences indicates that there are one or more conflicting preferences, i.e., conflicts, that preclude their ability to message with each devices' presently configured set of preferences enforced. That is, say, the first device 215 has a messaging preference for no webcam usage during messaging sessions, and the second device 205 has a messaging preference for webcam usage during messaging sessions; therefore, a conflict exists that precludes them from messaging. At this point, however, messaging can still occur without further delay if one of the devices has configured the automatic acquiescence parameter for the webcam messaging preference to automatically re-configure the webcam messaging preference to allow or disallow webcam use during a messaging session. As a result, the former conflict is automatically removed, and the messaging session can now commence. In a sense, configuring the automatic acquiescence parameter can be thought of as a one-time waiver of a messaging preference that a user is willing to re-configure for a messaging session, but is a configuration that the user of the device would generally not prefer.

In addition to automatic acquiescence, the configurator module 225 obviously permits manual acquiescence, but to avoid any possible confusion, this is explained. Manual acquiescence is merely re-configuring already configured messaging preferences. Since the configurator module 225 already allows for configuring the messaging preferences as explained above, manual acquiescence can be thought of as re-configuring, i.e., re-setting, a configured messaging preference, a situation that may arise, for example, after comparison of two devices' sets of messaging preferences yields results showing a conflict. To remove this conflict, a user may manual acquiescence, i.e., waive, the conflict by manually re-setting the user's messaging preference to remove this conflict, and, thereby, allow the improved messaging session to commence. Such a manual acquiescence would be a solution for commencing the intended messaging session having a current conflict when neither of the devices' messaging preferences had a configured acquiescence parameter to otherwise solve this problem.

After using the configuration module 225 to optionally initially configure or re-configure preferences from possible default preferences set by a vendor of the messaging service provider systems 220 installed on the first device 215, the system 200 depicts a receiver 235 for receiving a second set 240 of preferences from a second device 205 having messaging capabilities and in network 210 communication with the first device 215. The receiver 235 may receive, for example, a copy of the second set 240 of preferences from a second device 205 in a packet. The second set 240 of preferences may be the same or different as the first set 227 of preferences for the first device 215. In one example embodiment, after the receiver 235 receives the second device's 205 second set 240 of preferences, the comparison module 245, enabled by encoded logic, compares the second device's 205 second set 240 of preferences to the first device's 215 first set 227 of preferences to yield results 247. If the results 247 indicate that no conflicting preferences, i.e., conflicts, exist between the second device's 205 second set 240 of preferences and the first device's 215 first set 227 of preferences, then the determination module 255, also enabled by encoded logic, determines that the messaging parties may commence messaging with each of the sets 227, 240 of preferences enforced by the enforcement modules 257, 287 throughout the messaging session. In this manner, the messaging parties, that is, the user of the first device 215 and the user of the second device 205, proceed to engage in a messaging session with the user of the first device 215 having full awareness of each user's preferences in effect during their messaging session.

In another example embodiment, further aspects of the invention are disclosed. In this example, after each user optionally uses its configuration module 225, 265 located on their device 205, 215, the second device 205 also receives the first device's 215 first set 227 of preferences by a receiver 270 located on the second device 205. Receiving of the sets 227, 240 of preferences, themselves, may occur in various manners permitted by coded logic. Examples include the initiating user automatically sending a copy of its set of preferences in a packet upon a request for initiation of an intended messaging session, and the receiving device may automatically respond in kind with a copy of its set of preferences. Another example would require a formal request by the receiving device for the initiating device's set of preferences. Many variations on how the receivers 235, 270 actually receive the sets 227, 240 of preferences are possible, and these variations are encompassed by this disclosure although not specifically detailed by further example.

After each device 205, 215 receives the other's set 227, 240 of preferences, the comparison modules 245, 270 found on each device 205, 215 yields results 247, 277 that show whether any conflicting preferences, i.e., conflicts exist. If not, then the determination modules 255, 285, enabled by encoded logic, independently determine that the messaging parties may commence messaging with each of the sets 227, 240 of preferences enforced, by enforcement modules 257, 287, throughout the messaging session. In this manner, both messaging parties, that is, the users of the first device 215 and the user of the second device 205, proceed to engage in a messaging session with both users having full awareness of each user's preferences in effect during their messaging session.

If, however, one or more conflicts do exist, then a further aspect of the invention is realized through the use of the negotiation modules 250, 280, which are enabled by further logic coded in software and/or reduced to hardware. The negotiation modules 250, 280 permit the users intending to engage in a messaging session the ability to modify their respective sets 227, 240 of messaging preferences in order to remove the one or more conflicts realized based on the results 247, 277 distilled by the comparison modules 245, 275. The negotiation modules 250, 280 provide the intended messaging users the ability to discuss through a dialogue box, for example, how and whether to modify the one or more conflicts in order to allow the users to engage in a messaging session governed by preferences that each user finds acceptable. Through use of the negotiation modules 250, 280, one or both parties may decide to re-configure their respective set 227, 240 of messaging preferences, whereby a re-comparison of the re-configured sets 227, 240 of messaging preferences through use of the comparison modules 245, 275 yields results 247, 277 indicating removal or non-removal of former conflicts or even new conflicts. In short, the negotiation modules 250, 280 provide for iterative re-processing with a goal to modify one or more conflicts by either or both intended messaging users. If the negotiation is successful, i.e., conflicts no longer exist in the results 247, 277, then the determination modules 255, 285 determine that the messaging session may commence with the modified results 247, 277, which are passed to the enforcement modules 257, 287, which enforce these messaging preferences throughout their messaging session. After the messaging session terminates, default modules 260, 290, enabled by coded logic, return each user's sets 227, 240 of preferences to their settings prior to the user's messaging session. That is, the default modules 260, 290 return each user's sets 227, 240 of preferences to their default settings.

If, however, the negotiation is unsuccessful, then the determination modules 255, 285 determine that the messaging session will not commence, and, instead, abort the intended messaging session. By the above-example embodiment, both intended messengers are provided the ability to negotiate and remove otherwise conflicting preferences, and allow or disallow both users to engage in a messaging session with enforcement of their possibly modified sets 227, 240 of messaging preferences. As a result, if the improved messaging session commences after negotiation, then both users know, for example, whether their messaging session will be logged, whether colored font will be permitted, whether arguably offensive language is permitted, and so forth.

Figure 3A:
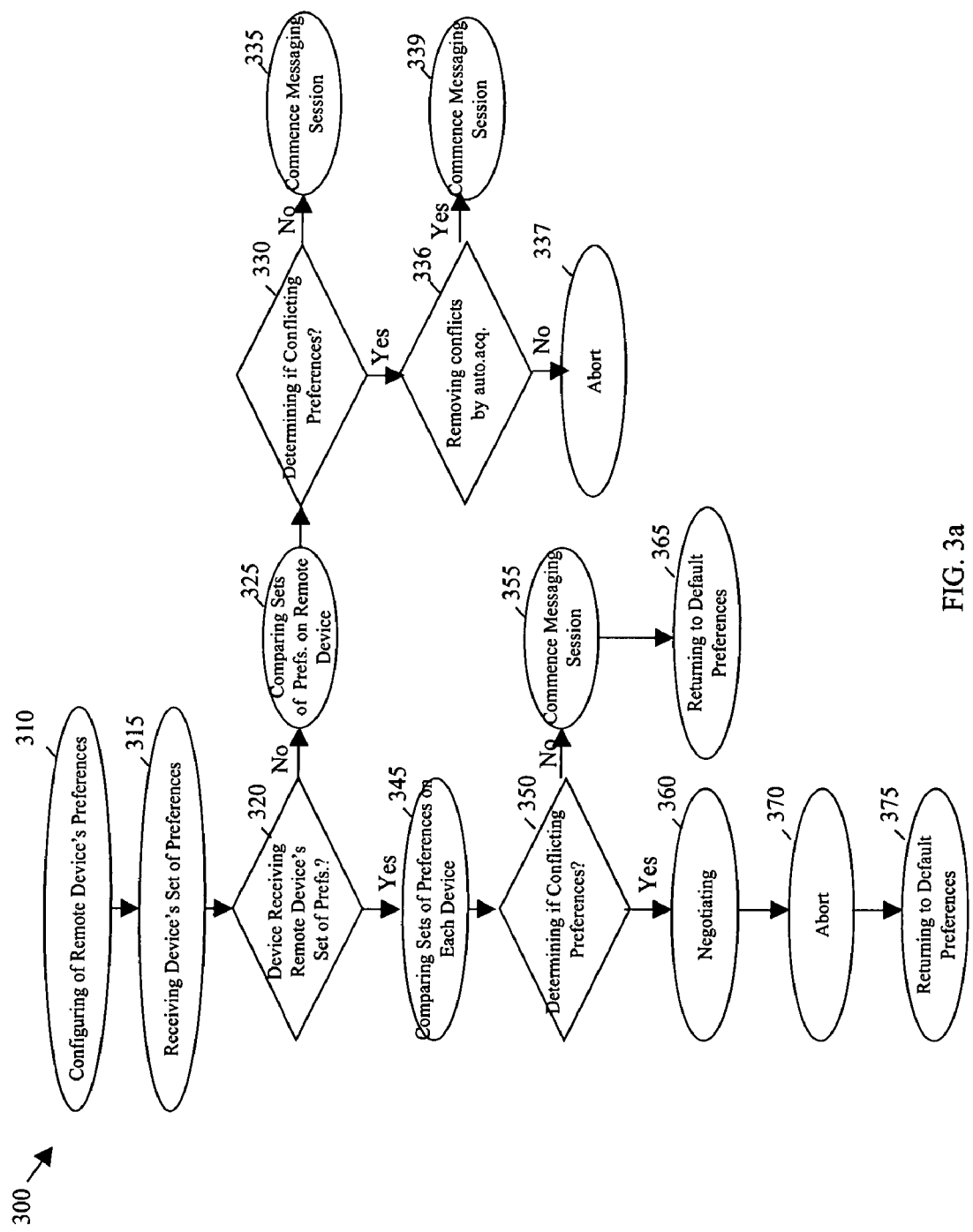
FIG. 3*a* depicts an example embodiment of a flowchart for messaging between a first device and a second device in accordance with the disclosed invention.

Turning now to FIG. 3a, another aspect of the invention is disclosed. In particular, an embodiment of a flowchart 300 for messaging between a first device having a first set of messaging preferences and a second device having a second set of preferences. Flowchart 300 is for a system, such as systems 100 and 200, as shown in FIG. 1 and FIG. 2.

Flowchart 300 begins by configuring 310 the set of preferences to be enforced by a second device used for messaging with first device. The devices may be a computer system, cellular telephone, PDA or pager having a capability for messaging through an installed messaging service provider system such as Lotus® Sametime®, American Online®'s ("AOL®'s") AIM$^{SM}$, MSN®, and Yahoo!®. Configuring 310 of the set of preferences for the second device involves setting, enabled by associated software and/or hardware, of messaging preferences that the user of the second device wishes to have in effect during a messaging session with any other or even a particular user of a device in communication with the second device through wired or wireless communication.

As part of the configuring 310, a user may optionally configure automatic acquiescence parameters associated with each of the messaging preferences. The automatic acquiescence parameters are a secondary structure associated with general configuration of the messaging preferences. For example, although a user may generally configure the emoticon messaging preference for no use of emoticons during messaging sessions, the same user may configure the automatic acquiescence parameter for emoticons usage to automatically switch the general emoticon prohibition configuration to allow emoticon usage if the other device with which the device intends to message requires emoticon usage during messaging sessions. Explained another way, configuration of automatic acquiescence parameters are a user's affirmative representation for automatic waiver, and, thereby, resetting, of a user's general and preferred configuration of a messaging preference in order to remove a conflicting messaging preference existing between devices that would otherwise preclude their ability to engage in a messaging session.

After optionally configuring 310 the second device's set of preferences, the flowchart 300 continues by the second device receiving 315 the first set of preferences from a first device with which the second device is intending to engage in a messaging session. Receiving 315 of the first device's first set of preferences by the second device may occur in a myriad of ways. By example, the second device may receive a copy of the first device's first set of preferences upon the user of the second device's textually entered request, the second device may automatically request the first device's first set of preferences after the first or second device requests initiation of a messaging session, or the first device may automatically send the second device its set of preferences in its request to initiate a messaging session with the second device. Other variations for receiving 315 the first set of preferences by the second device from the first device exist, and such variations are intended to be covered by this disclosure.

The flowchart 300 continues with decision block 320 querying whether the first device will also receive the second set of preferences associated with the second device. If not, then the flowchart 300 branches, and comparing 325 of the second device's second set of preferences to the first device's first set of preferences ensues on the second device. The comparing 325, enabled by coded logic in software and/or reduced to hardware associated with the second device, yields results indicating whether any conflicting preferences exist as depicted by decision block 330. If there are no conflicting preferences, then the flowchart 300 shows a processed determination 335, enabled by software and/or hardware, that messaging between the second device and the first device may commence. As such, the second device has full awareness of the first device's first set of preferences that will remain in effect during their messaging session, wherein the enforcement of the preferences is achieved by logic associated with the determining 335 to commence messaging on the second device. If conflicting preferences do exist, however, then decision block 330 results in aborting 337 the intended messaging session unless removing 336 of the one or more conflicts is achieved through, for example, a call from the second device to the first device to see if configured automatic acquiescence parameters on the first device will remove the one or more conflicts, and, if so, then messaging session occurs 339. If not, then no messaging session occurs 337 because the second device is unable to ensure that the intended messaging session will occur with awareness of the first device's first set of preferences. For example, the first device may log the messaging session between the second device and the first device contrary to the user of the second device's wishes as stated by the second device's choice of settings for its set of preferences.

Returning to decision block 320, if, according to the flowchart 300, the first device receives 320 the second set of preferences associated with the second device, then both the first device and the second device proceed down the flowchart 300 by comparing 345 the other device's set of preferences to their own set of preferences to yield respective results that indicate whether any conflicting preferences, i.e., conflicts, exist between the devices. As a side note, just as with the configuring 310 the second device's second set of preferences, a user may similarly and optionally configure the first set of preferences associated with the first device although flowchart 300 does not depict such.

After the comparing 345, a decision block 350 queries whether any conflicting preferences exist in the results independently processed by the second device and the first device. If not, then the flowchart 300 shows a processed determination 355, enabled by software and/or hardware, that messaging between the second device and the first device commences with enforcement of the sets of messaging preferences. As such, the second device and the first device have full awareness of each device's set of preferences that will remain in effect during their messaging session, wherein the enforcement of the preferences is achieved by logic associated with the determining 355 to commence messaging on both devices.

If the results of the comparing 345 at the decision block 350 do result in conflicting preferences, then the flowchart 300 continues downward to negotiating 360, which is also enabled by coded logic associated with each of the devices. The negotiating 360 enables the users intending to engage in a messaging session to modify their conflicting preferences so that acceptable sets of preferences are achieved that will govern their hopeful messaging session. The negotiating 360 permits the users to modify one or more settings in either or both sets of preferences by re-configuring their respective sets of preferences. Such negotiating 360 may occur by the intended messengers communicating, for example, through the use of dialogue boxes, a feature enabled by associated logic software and/or hardware.

Figure 3B:
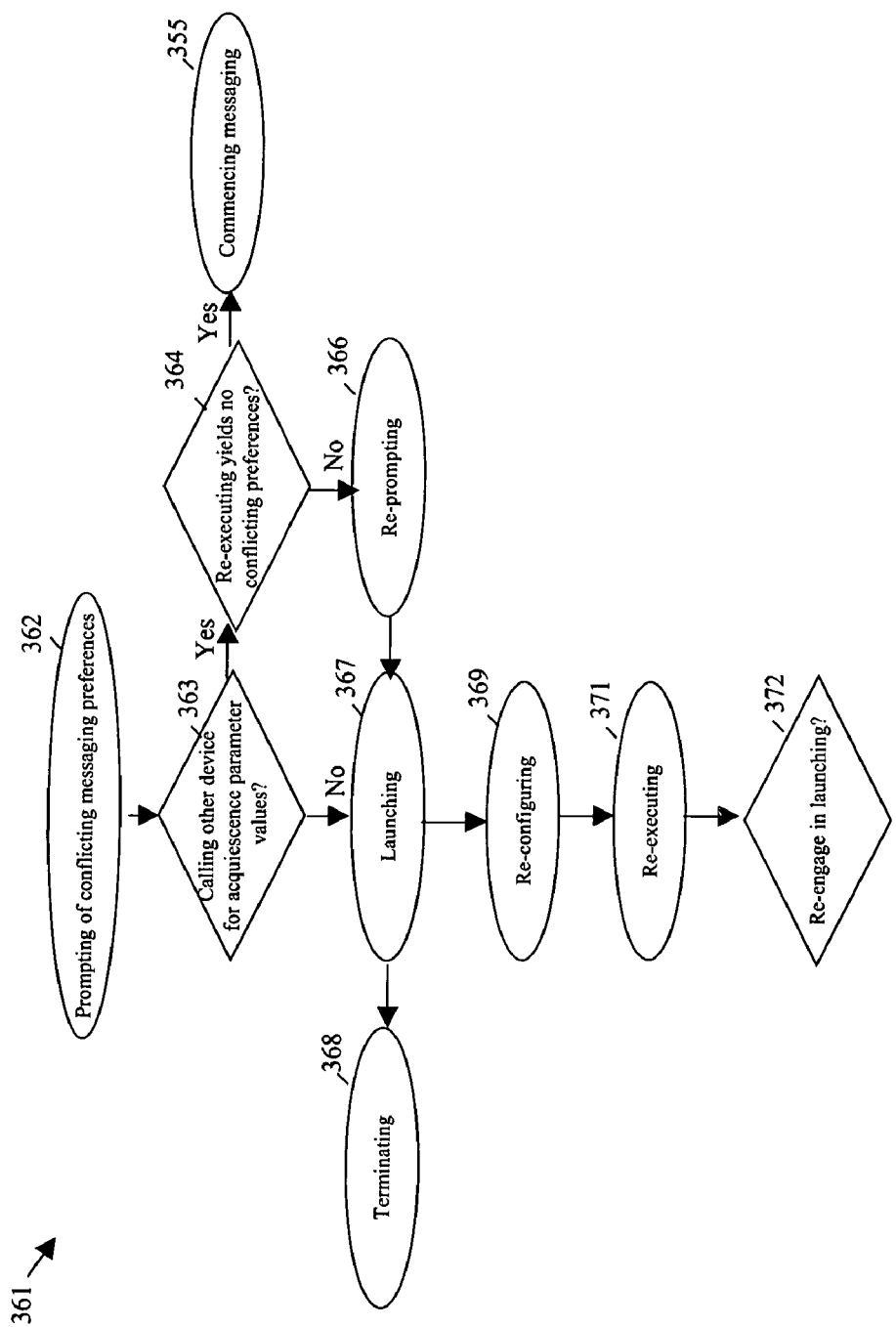
FIG. 3*b* depicts an example embodiment of a flowchart for negotiating between a first device and a second device in accordance with the disclosed invention.

Turning now to FIG. 3b, an expansive view of an example embodiment for the negotiating 360 shown on FIG. 3a is depicted. Flowchart 361 shows prompting 362 on a display, for example, on each device of the one or more conflicting messaging preferences, and optionally the non-conflicting messaging preferences, existing between the devices known as a result of the comparing 345 shown on FIG. 3a. The prompting 362 is a list, for example, appearing on each device's display that summarily reports the existing conflicting preferences preventing the devices to engage in a messaging session. After the prompting 362, flowchart 361 shows each device optionally calling 363 the other device over a network to see if the devices have configured automatic acquiescence parameters, whereby a re-executing 364 decision block stands for re-execution of the receivings 312, 320 by the devices with the values for any automatic acquiescence parameters, then engage in comparing 345 and a determining block 350 to result in commencing 355 messaging as shown on FIG. 3a, and repeated on FIG. 3b, if no more conflicting preferences exist. If no, that is, conflicting preferences still exist, then re-prompting 366 on the devices occurs that show the list of conflicting preferences still existing If the re-prompting 366 occurs, or if the optional calling 363 does not occur, then the launching 367 of dialogue boxes for textual entry by the users of the devices occurs. The launching 367 enables the users to engage in a real time discussion on how to remove the existing conflicting preferences so that they can engage in an improved messaging session with modified or unmodified messaging preferences acceptable to the users. During this launching 367, which may occur repeatedly until a user terminates 368 the launching 367, which results in aborting 370 the intended messaging session as shown on FIG. 3a, the users may state what messaging preferences they are willing to change, what they will not change, what messaging preferences the other should change, and so on. For example, the user of the first device may state to the user of the other device in a launched dialogue box unwillingness to modify its messaging preference for no logging during messaging sessions. In response, the user of the other device in one or more dialogue boxes may attempt to persuade the user of the device with reasoning, agree to unwillingness, and so on. If and once the users agree on what messaging preferences one or both users should modify to engage in a messaging session made possible by the launching 367, one or both users re-configure 369 messaging preferences on their device in accordance with the discussion had as a result of the launching 367. The re-configuring 369 then results in re-executing 371 the receivings 312, 320 having the modified user preferences from each device, then engage in comparing 345, and a determining block 350 to result in commencing 355 messaging as shown on FIG. 3a if no more conflicting preferences exist and the modified user preferences are enforced during the improved messaging session. If a conflicting preferences still exist, however, whether by mistake or trickery, then the devices may optionally re-engage 372 in the negotiating as shown by decision block. If not, then the intended messaging session is aborted 370 and each device's messaging preferences return 375 to their default settings as shown on FIG. 3a. Similarly, for successfully negotiated messaging sessions, the users' default messaging preferences return 365 to default preferences at the end of the messaging session as shown on FIG. 3a.

Figure 4:
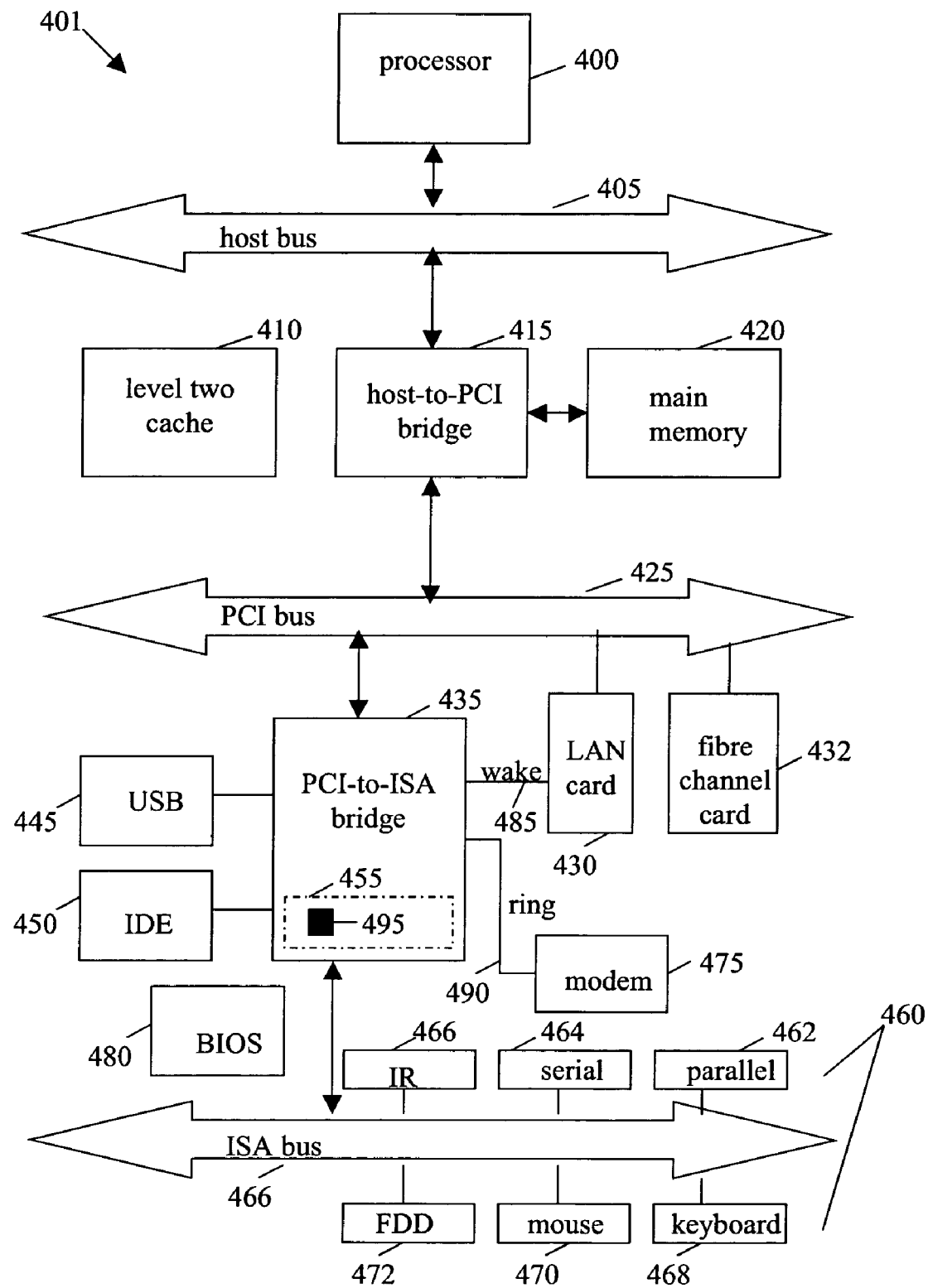
FIG. 4 depicts a computer system capable of being a device, when provided with the appropriate messaging service software, for engaging in messaging with another non-depicted device.

FIG. 4 illustrates information handling system 401 which is a simplified example of a computer system capable of performing the operations described herein. Computer system 401 includes processor 400 which is coupled to host bus 405. A level two (L2) cache memory 510 is also coupled to the host bus 405. Host-to-PCI bridge 415 is coupled to main memory 420, includes cache memory and main memory control functions, and provides bus control to handle transfers among PCI bus 425, processor 400, L2 cache 410, main memory 420, and host bus 405. PCI bus 425 provides an interface for a variety of devices including, for example, LAN card 430. PCI-to-ISA bridge 435 provides bus control to handle transfers between PCI bus 425 and ISA bus 440, universal serial bus (USB) functionality 445, IDE device functionality 450, power management functionality 455, and can include other functional elements not shown, such as a real-time clock (RTC), DMA control, interrupt support, and system management bus support. Peripheral devices and input/output (I/O) devices can be attached to various interfaces 460 (e.g., parallel interface 462, serial interface 464, infrared (IR) interface 466, keyboard interface 468, mouse interface 470, fixed disk (HDD) 472, removable storage device 474) coupled to ISA bus 440. Alternatively, many I/O devices can be accommodated by a super I/O controller (not shown) attached to ISA bus 440.

BIOS 480 is coupled to ISA bus 440, and incorporates the necessary processor executable code for a variety of low-level system functions and system boot functions. BIOS 480 can be stored in any computer readable medium, including magnetic storage media, optical storage media, flash memory, random access memory, read only memory, and communications media conveying signals encoding the instructions (e.g., signals from a network). In order to attach computer system 401 to another computer system to copy files over a network, LAN card 430 is coupled to PCI bus 425 and to PCI-to-ISA bridge 435. Similarly, to connect computer system 401 to an ISP to connect to the Internet using a telephone line connection, modem 475 is connected to serial port 464 and PCI-to-ISA Bridge 435.

While the computer system described in FIG. 4 is capable of executing the invention described herein, this computer system is simply one example of a computer system. Those skilled in the art will appreciate that many other computer system designs are capable of performing the invention described herein.

Another embodiment of the invention is implemented as a program product for use with a computer system such as, for example, the system 100 and system 200 shown in FIG. 1 and FIG. 2. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

While the foregoing is directed to example embodiments of the disclosed invention, other and further embodiments of the invention may be devised without departing from the basic scope thereof, and the scope thereof is determined by the claims that follow.

What is claimed is:

1. A computer-implemented method for improved messaging between a first device and a second device, the method comprising:
receiving, by the first device having a first set of messaging preferences, a second set of messaging preferences from the second device in communication with the first device and at least one processor coupled to memory, wherein the first set and the second set of the messaging preferences comprise optionally configurable and available application capabilities during a session of the improved messaging;

comparing, by the first device, the first set of messaging preferences to the second set of messaging preferences;

determining, by the first device, whether to commence the improved messaging if one or more conflicts are revealed by the comparing;

receiving, by the second device, the first set of messaging preferences from the first device in communication with the second device;

comparing, by the second device, the first set of messaging preferences to the second set of messaging preferences;

determining, by the second device, whether to commence the improved messaging if any conflicts are revealed by the comparing by the second device; and resolving the one or more conflicts, wherein the resolving is selected from the group consisting of automatically acquiescing and negotiating through dialogue boxes launched from both the first device and the second device.

2. The method of claim 1, wherein the automatically acquiescing is selected from the group consisting of by the first device and by the second device, to the one or more conflicts, whereby the determining results in commencing the improved messaging if all of the one or more conflicts are resolved.

3. The method of claim 1, wherein the negotiating comprises re-setting one or more of the messaging preferences selected from the group consisting of the first set and the second set.

4. The method of claim 1, further comprising enforcing, during the messaging session, the first set of messaging preferences and the second set of messaging preferences resulting from the negotiating.

5. The method of claim 1, further comprising returning the first set of messaging preferences and the second set of messaging preferences to default settings after terminating the improved messaging session.

6. A tangible non-transitory computer program product for improved messaging between a first device and a second device, comprising:

a computer readable storage device;

first instructions to receive, by the first device having a first set of messaging preferences, a second set of messaging preferences from the second device in communication with the first device, wherein the first set and the second set of the messaging preferences comprise optionally configurable and available application capabilities during a session of the improved messaging;

second instructions to compare, by the first device, the first set of messaging preferences to the second set of messaging preferences;

third instructions to determine, by the first device, whether to commence the improved messaging if one or more conflicts are revealed by the comparing;

fourth instructions to receive, by the second device, the first set of messaging preferences from the first device in communication with the second device;

fifth instructions to compare, by the second device, the first set of messaging preferences to the second set of messaging preferences;

sixth instructions to determine, by the second device, whether to commence the improved messaging if any conflicts are revealed by the comparing by the second device; seventh instructions to resolve the one or more conflicts, wherein the resolving is selected from the group consisting of automatically acquiescing and negotiating through dialogue boxes launched from both the first device and the second device and wherein the first, second, third, fourth, fifth, sixth, and seventh program instructions are stored on the computer readable storage device.

7. The computer program product of claim 6, further comprising seventh instructions to acquiesce, automatically, selected from the group consisting of by the first device and by the second device, to the one or more conflicts, whereby execution of the third and sixth instructions to determine results in commencing the improved messaging if all of the one or more conflicts are resolved; and wherein the seventh program instructions are stored on the computer readable storage device.

8. computer program product of claim 6, further comprising seventh instructions to negotiate between the first device and the second device in order to resolve the one or more conflicts, whereby execution of the third and sixth instructions to determine results in commencing the improved messaging if all of the one or more conflicts are resolved; and wherein the seventh program instructions are stored on the computer readable storage device.

9. The computer program product of claim 8, wherein the seventh instructions to negotiate comprises to instructions to re-set one or more of the messaging preferences selected from the group consisting of the first set and the second set.

10. The computer program product of claim 8, further comprising eighth instructions to enforce, during the messaging session, the first set of messaging preferences and the second set of messaging preferences resulting from performing the seventh instructions to negotiate; and wherein the eighth program instructions are stored on the computer readable storage device.

11. The computer program product of claim 7, further comprising eighth instructions to return the first set of messaging preferences and the second set of messaging preferences to default settings after terminating the improved messaging session; and wherein the eighth program instructions are stored on the computer readable storage device.

12. The computer program product of claim 8, further comprising eighth instructions to return the first set of messaging preferences and the second set of messaging preferences to default settings after terminating the improved messaging session; and wherein the eighth program instructions are stored on the computer readable storage device.

13. A computer-implemented system for improved messaging between a first device and a second device, the method comprising:

a processor, a computer readable memory and a computer readable storage device;

first instructions to receive, by the first device having a first set of messaging preferences, a second set of messaging preferences from the second device in communication with the first device, wherein the first set and the second set of the messaging preferences comprise optionally configurable and available application capabilities during a session of the improved messaging;

second instructions to compare, by the first device, the first set of messaging preferences to the second set of messaging preferences;

third instructions to determine, by the first device, whether to commence the improved messaging if one or more conflicts are revealed by the comparing;

fourth instructions to receive, by the second device, the first set of messaging preferences from the first device in communication with the second device;

fifth instructions to compare, by the second device, the first set of messaging preferences to the second set of messaging preferences;

sixth instructions to determine, by the second device, whether to commence the improved messaging if any conflicts are revealed by the comparing by the second device;

seventh instructions to resolve the one or more conflicts, wherein the resolve is selected from the group consisting to automatically acquiesce and negotiate through dialogue boxes launched from both the first device and the second device; and wherein the first, second, third, fourth, fifth, sixth, and seventh program instructions are stored on the computer readable storage device for execution by the processor via the computer readable memory.

14. The system of claim 13, wherein the seventh instructions to automatically acquiesce is selected from the group consisting of by the first device and by the second device, to the one or more conflicts, whereby the determining results in commencing the improved messaging if all of the one or more conflicts are resolved.

15. The system of claim 13, wherein the seventh instructions to negotiate comprises to re-set one or more of the messaging preferences selected from the group consisting of the first set and the second set.

16. The system of claim 13, further comprising eighth program instructions to enforce, during the messaging session, the first set of messaging preferences and the second set of messaging preferences resulting from performing the seventh instructions to negotiate; and wherein the eighth program instructions are stored on the computer readable storage device for execution by the processor via the computer readable memory.

17. The system of claim 13, further comprising eighth program instructions to return the first set of messaging preferences and the second set of messaging preferences to default settings after terminating the improved messaging session; and wherein the eighth program instructions are stored on the computer readable storage device for execution by the processor via the computer readable memory.

* * * * *